Jan. 1, 1924
A. J. COON
1,479,428
TRAFFIC SIGNAL FOR VEHICLES
Filed April 20, 1920  2 Sheets-Sheet 1
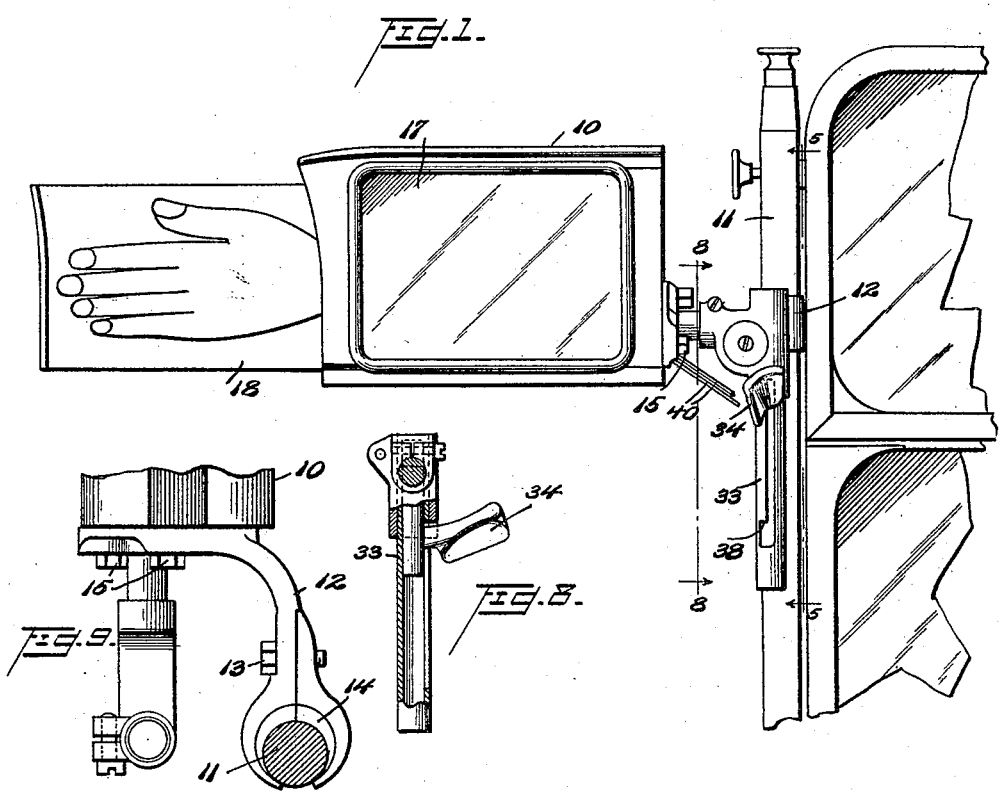
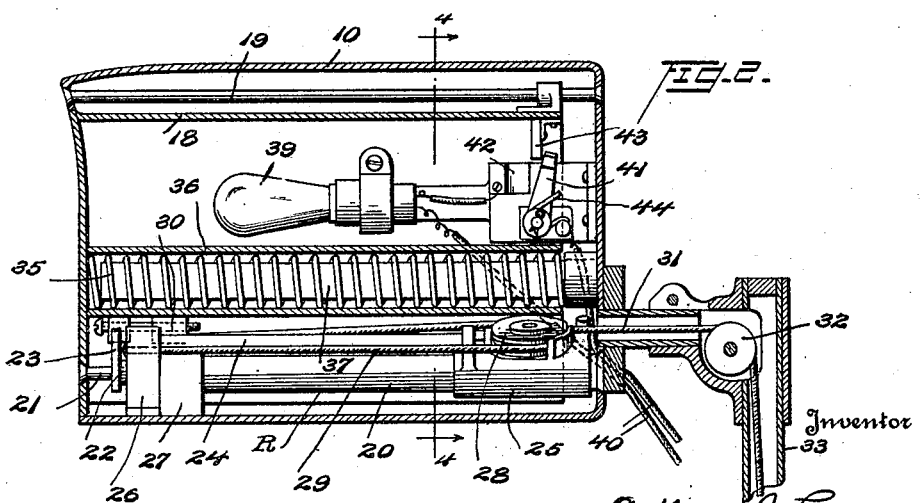
Inventor
Arthur J. Coon,
By Watson, Cott, Morse & Grindle,
Attorneys.

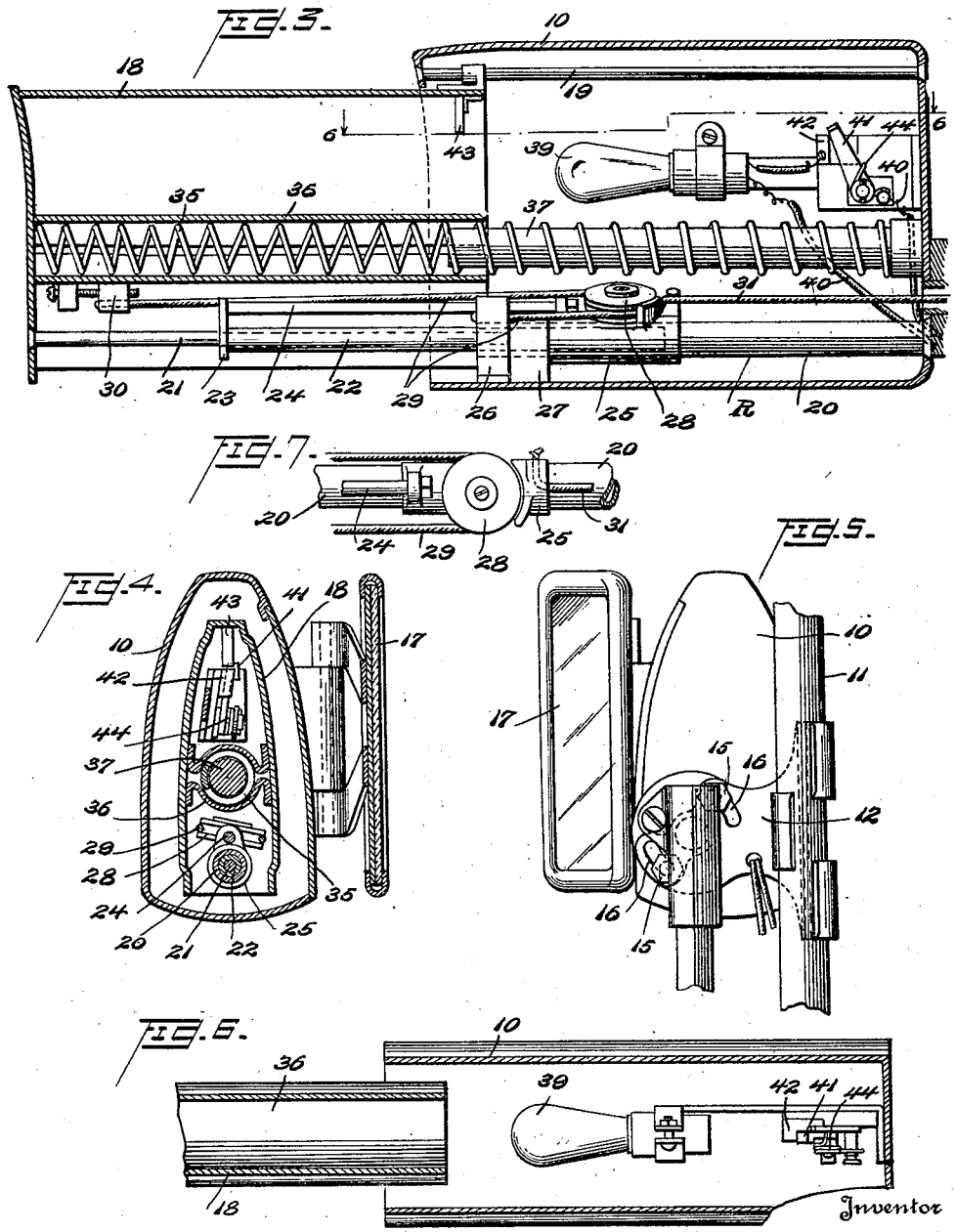

Patented Jan. 1, 1924.

1,479,428

UNITED STATES PATENT OFFICE.

ARTHUR J. COON, OF PROVIDENCE, RHODE ISLAND.

TRAFFIC SIGNAL FOR VEHICLES.

Application filed April 20, 1920. Serial No. 375,302.

*To all whom it may concern:*

Be it known that I, ARTHUR J. COON, a citizen of the United States, and residing at Providence, Providence County, State of Rhode Island, have invented certain new and useful Improvements in Traffic Signals for Vehicles, of which the following is a specification.

It is the object of this invention to provide an improved traffic signal of the type carried by vehicles, particularly motor vehicles; and by means of which the driver or chauffeur is enabled to indicate his intention to stop or turn so that drivers of nearby vehicles, and also pedestrians, have warning of the intended maneuver. Many signals of this character have been heretofore designed or suggested but, notwithstanding their advantages and utility in avoiding accidents, they have not come into general use for various reasons such as high initial cost, inconvenience, and unsightliness.

The particular objects of this invention are to provide such a device which is not only inexpensive, convenient, and effective in operation, but which is attractive and ornamental in appearance. Further objects are; to provide a signal which is conspicuous at night as well as in the daytime; which may be operated with a minimum of effort; and which may be readily applied to vehicles of different types.

Fig. 1 of the accompanying drawings illustrates in rear elevation a portion of the windshield of an automobile showing the improved traffic signal, with indicator extended, attached to its side post;

Fig. 2 is a vertical longitudinal section through the signal, the indicator being retracted;

Fig. 3 is a similar view, but showing the indicator extended;

Fig. 4 is a section on line 4—4 of Figure 2;

Fig. 5 is an end view of the signal as seen from the right, on line 5—5, Figure 1;

Fig. 6 is a section on line 6—6 of Figure 3, parts of the mechanism being omitted;

Fig. 7 is a plan view of the pulley guide illustrated in Figures 2, 3 and 4;

Fig. 8 is a section on line 8—8 of Figure 1, part being broken away; and

Fig. 9 is a plan view of the bracket by means of which the signal is attached to the side post of the windshield.

The casing 10 of the signal is adjustably secured to the side post 11 of the windshield by a substantially L-shaped bracket 12 which is split at its inner end, as shown clearly in Figure 9, the two portions being detachably secured together by screw bolts 13, and enclosing and gripping the side post 11. Bushings 14 of bronze or Babbitt metal are provided and, in practice, bushings of various sizes are supplied so that the signal may be secured to vehicles having windshield side posts of different cross sections. The outer end of bracket 12 is secured to the casing 10 by screw bolts 15, the shanks of which pass through slots 16 in the bracket, as clearly shown in Figure 5. By loosening the bolts 15, the casing may be tilted for the purpose of bringing the traffic mirror 17 rigidly secured thereto into proper adjustment for any particular driver or chauffeur.

Normally housed within the casing is the extensible indicator 18 which may have, as illustrated in the drawings, the outline of a human hand thereon or some other suitable mark or legend. The hand illustrated may be enameled white, and the remainder of the extensible indicator may be enameled red so that the device when extended will not fail to attract, by its conspicuousness, the attention of nearby vehicle drivers and pedestrians. For night use an electric lamp is provided for illuminating the indicator, as will be hereinafter more fully explained.

The extensible indicator 18 is slidably mounted upon top and bottom supporting rods 19 and R respectively, the upper rod being permanently secured at its ends to the opposite ends of the casing and the lower rod being formed in three telescoping sections, the inner section 20 of which is in the form of a hollow tube rigidly connected to the casing, the outer section 21 being much smaller and rigidly connected to the indicator, and the intermediate section 22 being a hollow tube fitting outside of rod 21 and inside of tube 20, and being movable relatively to both indicator and casing in the operation of the signal. The outer end of the intermediate section 22 of the lower supporting rod R has secured thereto a transverse member 23 to which the outer end of a rod 24 is secured, the inner end of this rod being attached to a lug on the sliding sleeve or member 25 so that the latter is movable with the intermediate section 22 along tube 20, in the operation of the signal.

Intermediate section 22 and rod 24, have sliding fits in apertures in a transverse partition 26 rigidly secured to the casing 10, and a rubber bumper 27 is mounted on tube 20 adjacent lug or partition 26 to serve as a buffer for the sliding member 25 at the outward limit of its travel.

Rotatably mounted on the top of member 25 is a guide pulley 28, and a cord 29 having its outer end secured to a block 30 adjustably connected to the casing, and its inner end permanently secured to the lug or partition 26 attached to the casing 10, passes over this pulley and is guided thereby. A second cord 31 has its outer end permanently secured to the sliding member 25 and passes through the inner end of the casing and over a pulley 32 and downwardly through vertical tube 33, having its lower end connected to the operating member 34.

This operating member comprises a cylindrical portion fitting within tube 33 and a finger piece extending through a slot in the tube and adapted to be manipulated by the hand in the operation of the signal. A coiled spring 35 is positioned within the cylindrical hollow spring housing 36 secured to the indicator 18, and around the rod 37 which is coaxial with housing 36 and has its inner end secured to the casing 10. This spring is normally under compression and tends to project the indicator from the casing.

When extended, the operating member 34 is at the upper limit of its travel, as illustrated in Figures 1 and 8. To retract the signal, this member is grasped by the fingers or hand and drawn downwardly, whereupon the cord 31 pulls member 25 inwardly along tube 20 and cord 29 draws the signal inwardly at double the ratio of travel of the operating member 34, because of the mechanical action of pulley 28 and cord 29. When in its lowermost position, operating member 34 is slightly rotated so that its stem is caught under shoulder 38 of the tube 33, in which position it is held, restraining the spring 35 from again extending the indicator. If at any time it is desired to extend the indicator, it is only necessary to rotate the operating member 34 laterally to disengage it from notch 38, whereupon the spring instantly acts to extend the indicator into warning position.

In order that the device may be useful at night, an electric lamp 39 is provided having lead wires 40 connected to a battery or generator on the vehicle. A spring pressed switch member 41 is held out of contact with a fixed contact 42 by an insulated block 43 secured to the indicator, when the indicator is in retracted position. The coiled spring 44, however, constantly tends to throw switch 41 into contact with contact 42 and complete the circuit through the lamp. It will be seen, therefore, that as soon as the indicator is extended, the switch 41 will move outwardly and the lamp will be lighted, the rays of light therefrom being reflected from the inner walls of the casing along the sides of the indicator, so that the enameled indicator is clearly illuminated. This enables the device to be used at night with the same or greater effect, as when used in the daytime. If desired, portions of the indicator may be transparent or translucent.

The attachment of this signal to a motor vehicle of standard type is a simple matter and after attachment its adjustment for the purpose of bringing the mirror 17, which is rigidly secured on its rear face, into correct position, may be readily accomplished. The component parts of the signal are of light construction, simple and easy to manufacture and the completed signal is comparatively inexpensive. By using the intermediate sliding member with the guide pulley mounted thereon, it is possible for the operator, by moving the operating member 34 a slight distance, to retract the indicator quickly through twice the distance. If desired, additional pulleys may be provided over which the cord 29 may be passed to obtain additional advantage in this respect. The signal may be adapted for use with closed cars, so that it may be operated from within the car, by simply changing the construction of the supporting bracket. It will be obvious also to those skilled in the art that other changes may be made in the form and arrangement of the various parts of the invention, which is, therefore, not limited to the exact form illustrated and described.

Having thus described the invention what is claimed as new and desired to be secured by Letters Patent is:

1. A traffic signal for vehicles comprising, in combination, a casing adapted to be secured to the vehicle, an indicator normally housed within said casing, means projecting said indicator without the casing, and means for retracting the same, said means including a movable guide member and a cord passing over said guide and having one end attached to the indicator and the other end attached to the casing.

2. A traffic signal for vehicles comprising in combination, a support adapted to be secured to the vehicle, an indicator movably mounted on the support, means for extending the indicator, and means for retracting the same comprising an operating member, and mechanism connecting the indicator and operating member including a cord and guide therefor whereby the indicator is caused to travel a greater distance than the operating element is moved.

3. A traffic signal for vehicles comprising in combination, a support adapted to be secured to the vehicle, an indicator movably mounted on the support, means for extending the indicator, and means for retracting the same comprising an operating member, a guide movably mounted on the support and connected to said operating member, and a cord connected to the support and indicator and passing around said guide.

4. A traffic signal for vehicles comprising in combination, a support adapted to be secured to the vehicle, an indicator movably mounted on the support means for extending the indicator and means for retracting the same comprising an operating member, a guide slidably mounted on the support, a flexible member connecting the guide and operating member and a cord connected to the support and indicator and passing around said guide.

5. A traffic signal for vehicles comprising in combination, a support adapted to be secured to the vehicle, an indicator movably mounted on the support, means for extending the indicator, and means for retracting the same comprising an operating member, a member slidably mounted on said support and bearing a guide pulley, a cord connecting the slidable member and the operating member, and a second cord connected to the support and indicator and passing around said guide pulley.

6. A traffic signal for vehicles comprising, in combination, a casing adapted to be secured to the vehicle, an indicator normally housed within said casing, spring means for projecting said indicator without the casing, means for retracting the same and holding it in retracted position, said means including an operating element adapted to serve as a handle in retracting the indicator and as a latch for releasably locking the indicator in retracted position, and a catch for receiving said operating element when the indicator is in retracted position.

7. A traffic signal for vehicles comprising, in combination, a support adapted to be secured to a vehicle, an indicator movably mounted on said support, spring means mounted on the support for projecting the indicator laterally, means for retracting the same against the action of the spring and holding it in retracted position, said means including a vertically movable operating element adapted to serve as a handle in retracting the indicator and as a latch for releasably locking the indicator in retracted position, and a catch for receiving said operating element when the indicator is in retracted position.

8. A traffic signal for vehicles comprising in combination, a support adapted to be secured to the vehicle, an indicator movably mounted on the support, means for extending the indicator, and means for retracting the same comprising an operating member, a member slidable relatively to the support and indicator and carrying a guide pulley, a cord connecting the slidable member and the operating member, and a second cord having one end secured to the indicator and its other end secured to the support and passing around the pulley, whereby the indicator is moved twice the distance that the operating member is moved, in retraction.

9. A traffic signal for vehicles comprising, in combination, a movable indicator, a support adapted to be secured to the vehicle and having top and bottom supporting rods for the indicator, said bottom rod consisting of three telescoping sections one of which is rigidly secured to the support, one rigidly secured to the indicator, and the third section slidable relatively to both support and indicator, means for extending the indicator, and means for retracting the same including an operating member connected to said third section of the bottom supporting rod, a guide movable with said last mentioned section and a cord secured to the support and indicator and passing over the guide.

10. A traffic signal for vehicles comprising, in combination, a casing adapted to be secured to the vehicle, an indicator adapted to be housed within said casing and to be projected therefrom, means for moving said indicator in one direction, and second means for moving the indicator in the opposite direction, said means including a movable guide member and a cord passing over said guide member and having one end attached to the indicator and the other end attached to the casing.

In testimony whereof I affix my signature.

ARTHUR J. COON.